(12) United States Patent
Herrlich-Loos et al.

(10) Patent No.: US 7,932,332 B2
(45) Date of Patent: Apr. 26, 2011

(54) ISOBUTENE POLYMERISATION IN THE PRESENCE OF A DONOR AND FLUORINATED ACIDS COMPLEX

(75) Inventors: Mirjam Herrlich-Loos, Mannheim (DE); Christian Drohmann, Brasschaat (BE); Darijo Mijolovic, Mannheim (DE); Thomas Wettling, Limburgerhof (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1014 days.

(21) Appl. No.: 11/597,274

(22) PCT Filed: May 11, 2005

(86) PCT No.: PCT/EP2005/005093
§ 371 (c)(1),
(2), (4) Date: Nov. 20, 2006

(87) PCT Pub. No.: WO2005/116094
PCT Pub. Date: Dec. 8, 2005

(65) Prior Publication Data
US 2007/0225459 A1    Sep. 27, 2007

(30) Foreign Application Priority Data
May 19, 2004   (EP) .................................... 04011971

(51) Int. Cl.
*C08F 2/00* (2006.01)
(52) U.S. Cl. ....................................................... 526/209
(58) Field of Classification Search ................... 526/209
See application file for complete search history.

(56) References Cited

U.S. PATENT DOCUMENTS
5,556,932 A    9/1996  Rath et al.

FOREIGN PATENT DOCUMENTS

| EP | 0 322 241 | 6/1989 |
|----|-----------|--------|
| EP | 0 337 737 | 7/1995 |
| GB | 401 297   | 11/1933 |
| GB | 486 161   | 5/1938 |
| WO | 89/01001  | 2/1989 |
| WO | 95/26814  | 10/1995 |
| WO | 96/40808  | 12/1996 |

*Primary Examiner* — Ling-Siu Choi
*Assistant Examiner* — Sonya Wright
(74) *Attorney, Agent, or Firm* — Oblon, Spivak, McClelland, Maier & Neustadt, L.L.P.

(57) ABSTRACT

The invention relates to a method for producing mainly ethylenically unsaturated isobutene polymers, wherein the sum of proportions of molecules with a double bond in an α position and molecules with a double bond in a position β is increased to 75% mol by polymerising isobutene in a liquid phase in the presence of a diluted or dispersed catalyst complex which comprises (i) an electron donor and (ii) a compound of general formula (I) $H_a Me_b [MF_x]_c$, wherein Me is a metal with oxidation state m, M is an element selected from elements of the groups 2, 3, 4, 5, 10, 11, 13, 14 or 15 of the periodic table according to the IUPAC notation of an element oxidation number n, a is an integer $\geq 1$, b is an integer $\geq 0$, x is an integer $\geq 2$ and c is $[(a+mb)/(x-n)]$. The catalyst is preferably embodied in the form of $HBF_4 \cdot O(CH_3)_2$. The inventive method makes it possible to obtain an isobutene polymer having a low fluorine-content even using technical $C_4$ hydrocarbon portions as an isobutene source.

44 Claims, No Drawings

ISOBUTENE POLYMERISATION IN THE PRESENCE OF A DONOR AND FLUORINATED ACIDS COMPLEX

The invention relates to a process for polymerizing isobutene in the liquid phase.

The polymerization of isobutene to form essentially simply ethylenically unsaturated polyisobutenes is known. The double bond can assume various positions which differ in terms of their reactivity in the macro-molecule. The high-reactivity polyisobutenes are valued intermediates for their preparation of additives for lubricants and fuels. These have a high proportion of molecules in which the double bond is in the α position, i.e. in the form of a terminal group of the formula —[$CH_2C(CH_3)$=$CH_2$], or in the β position, i.e. in the form of a terminal group of the formula —[—CH=C$(CH_3)_2$].

High-reactivity polyisobutenes can, for example, be obtained by polymerization of isobutene or isobutene-comprising hydrocarbon streams in the presence of boron trifluoride as catalyst. However, catalysis using boron trifluoride results in, as secondary reaction, the addition of fluorine onto the polyisobutene and the formation of low molecular weight and medium molecular weight fluorine-comprising by-products, e.g. tert-butyl fluoride, diisobutyl fluoride or triisobutyl fluoride, which contaminate the polyisobutene. If industrial $C_4$-hydrocarbon streams, e.g. raffinate I, which comprise not only isobutene but also relatively large amounts of linear butanes, in particular 1-butene, are used as isobutene source, significantly higher fluorine contents are observed.

GB 486,161 describes a process for preparing high molecular weight products from isobutene and multiply unsaturated olefins. $BF_3HF$, inter alia, is mentioned as catalyst. The patent document gives no further information on carrying out a polymerization reaction using this catalyst; it is not concerned with high-reactivity polyisobutenes.

EP 322 241 describes a process for preparing high-reactivity polyisobutenes, in which isobutene is polymerized in the presence of boron trifluoride and a cocatalyst and the polymerization product is promptly quenched. Hydrogen fluoride, for example, is said to be suitable as cocatalyst.

EP 337 737 discloses a process for preparing poly-n-butenes, in which 1-butene, cis- and/or trans-2-butene are polymerized in the presence of boron trifluoride and hydrogen fluoride.

WO 89/01001 discloses a process for oligomerizing lower alkenes in the presence of a catalyst system comprising boron trifluoride and an acid, e.g. phosphoric acid.

WO 95/26814 describes supported Lewis-acid catalysts which are said to be suitable for catalyzing hydrocarbon transformation such as olefin polymerization and comprise particular salts of superacids. The complicated production of the catalyst is a disadvantage; in addition, precautions have to be taken to ensure that the catalyst remains uniformly suspended in the reaction medium.

It is an object of the invention to provide a process which allows high-reactivity isobutene polymers having a low fluorine content to be prepared.

This object is achieved by a process for preparing essentially singly ethylenically unsaturated isobutene polymers in which the sum of the proportions of molecules having the double bond in the α position and molecules having the double bond in the β position is at least 75 mol % by polymerization of isobutene in the liquid phase in the presence of a dissolved or dispersed catalyst complex which comprises (i) an electron donor and (ii) a compound of the general formula I $$H_a Me_b [MF_x]_c \qquad (I)$$

where
  Me is a metal in the oxidation state m,
  M is an element in the oxidation state n selected from among the elements of groups 2, 3, 4, 5, 10, 11, 13, 14 and 15 of the Periodic Table of the Elements according to the IUPAC notation,
  a is an integer $\geq 1$,
  b is an integer $\geq 0$,
  x is an integer $\geq 2$,
  c is [(a+mb)/(x−n)].

For the purposes of the present invention, "isobutene polymers" are polymers which comprise at least 50% by weight of monomer units derived from isobutene.

Preferred isobutene polymers comprise at least 80% by weight, preferably at least 90% by weight and in particular at least 95% by weight, of monomer units derived from isobutene.

If present, the monomer units which are different from isobutene are derived from ethylenically unsaturated monomers which can be copolymerized with isobutene under conditions of cationic polymerization. These include, in particular, vinylaromatics such as styrene, $C_1$-$C_4$-alkylstyrenes such as 2-, 3- and 4-methylstryene and also 4-tert-butylstyrene, isoolefins having from 5 to 10 carbon atoms, e.g. 2-methyl-1-butene, 2-methyl-1-pentene, 2-methyl-1-hexene, 2-ethyl-1-pentene, 2-ethyl-1-hexene and 2-propyl-1-heptene, and dienes such as 1,3-butadiene and isoprene. Further possible monomers are olefins which have a silyl group, e.g. 1-trimethoxysilylethene, 1-(trimethoxysilyl)propene, 1-(trimethoxysilyl)-2-methyl-2-propene, 1-[tri(methoxyethoxy)silyl]ethene, 1-[tri(methoxyethoxy)silyl]propene and 1-[tri(methoxyethoxy)silyl]-2-methyl-2-propene.

Suitable isobutene sources for the process of the invention include both isobutene itself and isobutene-comprising $C_4$-hydrocarbon streams, for example $C_4$ raffinates, $C_4$ fractions from the dehydrogenation of isobutene, $C_4$ fractions from steam crackers, FCC (fluid catalytic cracking) plants, which have preferably been largely free of 1,3-butadiene comprised therein. Suitable $C_4$-hydrocarbon streams generally comprise less than 1000 ppm, preferably less than 200 ppm, of butadiene. The sum of the proportions of isobutane, butane, 1-butene, cis- and trans-2-butene in the $C_4$-hydrocarbon streams is typically in the range from 20 to 90% by weight, usually from 40 to 70% by weight, with from 10 to 70% by weight (based on the total weight of the stream) being able to be made up of the butenes other than isobutene. Such $C_4$-hydrocarbon streams are preferred starting materials for the process of the invention. However, a mixture of pure isobutene with a nonolefinic diluent is also suitable as isobutene source.

The polymerization is carried out in the liquid phase, i.e. under pressure and temperature conditions under which the reaction mixture is at least partly present in condensed liquid form. The reaction mixture usually comprises a diluent or diluent mixture which is essentially inert toward the reagents used. Suitable diluents are saturated aliphatic or cycloaliphatic hydrocarbons such as butane, pentane, hexane, heptane, octane, cyclopentane, cyclohexane, methylcyclohexane; aromatic hydrocarbons such as toluene or ethylbenzene; unsaturated hydrocarbons such as ethylene, 1-butene, 2-butene, halogenated hydrocarbons such as methyl chloride, dichloromethane or trichloromethane and also mixtures of the abovementioned compounds. The solvents are preferably freed of oxygen-comprising impurities such as carbon monoxide, water, acetone, carboxylic acids or acidic impurities such as mineral acids, for example by adsorption on solid adsorbents such as activated carbon, molecular sieves or ion exchangers, before they are used in the process of the invention. When $C_4$ fractions are used, the hydrocarbons other than isobutene take on the role of an essentially inert diluent.

In the process of the invention, an unsupported catalyst which is dissolved or dispersed or emulsified in the liquid reaction mixture is used. The catalyst comprises a compound of the above formula (I). In the formula (I), Me is optional; preferred compounds of the formula (I) correspond to the formula $H_a[MF_x]$, where M, a and x are as defined above.

The catalyst is essentially free of compounds of the formula $MF_{x-1}$, i.e. in preferred embodiments in which $HBF_4$ is used as compound of the formula (I), the catalyst is essentially free of $BF_3$. Compounds of the formula $MF_{x-1}$ (in particular $BF_3$) are themselves known to be catalysts for the polymerization of isobutene; their presence leads to the advantages of the present invention not being fully realized.

The central atom M of the fluoroelement acid is an element selected among the elements of groups 2, 3, 4, 5, 10, 11, 13, 14 and 15 of the Periodic Table of the Elements according to the IUPAC notation, preferably Be, B, Al, Si, P, Ti, V, Ga, Ge, As, Y, Zr, Nb, In, Sn or Sb, in particular Be, B, Al, Si or P and particularly preferably B.

The nature of the metal Me is not critical. Me is preferably an alkali metal such as Li, Na, K, an alkaline earth metal such as Ca or Ag or Au.

In preferred embodiments, $H_aMe_b[MF_x]_c$ is selected from among $H_2BeF_4$, $HBF_4$, $HPF_6$, $H_2SiF_6$, $HMeSiF_6$, $HAlF_4$, $H_3AlF_6$, where Me is Li, Na or K.

The electron donor (hereinafter also referred to as "donor") comprises at least one heteroatom having a free electron pair, for example an oxygen, nitrogen, sulfur and/or phosphorus atom, preferably an oxygen, nitrogen and/or sulfur atom, in particular an oxygen and/or nitrogen atom.

In particular embodiments, the donor does not have any active hydrogen atoms, i.e. in particular no hydrogen atoms which are bound to an oxygen or nitrogen atom.

Suitable oxygen-comprising donors are alcohols, ketones, ethers, carboxylic acids and/or carboxylic esters.

Suitable alcohols are, for example, $C_1$-$C_{13}$-alkanols and $C_5$-$C_6$-cycloalkanols or $C_2$-$C_{10}$-alkanediols, e.g. methanol, ethanol, n-propanol, isopropanol, 2-butanol, t-butanol, 2-ethylhexanol; cyclohexyl alcohol; ethylene glycol or propylene glycol.

Suitable ketones are, inter alia, acetone, ethyl methyl ketone, acetoacetone or acetophenone.

Possible ethers are $C_2$-$C_{20}$-dialkyl ethers; cyclic ethers, in particular 5- or 6-membered cyclic ethers having one or two oxygen atoms in the ring, e.g. tetrahydrofuran or dioxane.

Suitable carboxylic acids or esters are acetic acid, propionic acid, butyric acid, caproic acid, benzoic acid and esters thereof, e.g. the methyl or ethyl esters.

Further suitable donors are nitrogen-comprising donors such as ammonia, organic amines or polyamines or hydroxylamine, nitrile compounds or amides.

Examples of organic amines are methylamine, dimethylamine, ethylamine, diethylamine, triethylamine, propylamine, isopropylamine, diisopropylamine, 2-ethylhexylamine, diisobutylamine, sec-butylamine, tert-butylamine, tri-n-octylamine, di-2-ethylhexylamine, allylamine, diallylamine, triallylamine, aniline, benzylamine, ethylenediamine, hexamethylenediamine, tetramethylethylenediamine, diethylenetriamine, triethylenetetramine and tetraethylpentamine, 3-(methylamino)propylamine, 3-(dimethylamino) propylamine and 3-(dibutylamino)propylamine; oxyamines such as 3-methoxypropylamine, 3-ethoxypropylamine, and 3-(2-ethylhexyloxy)propylamine; hydroxylamines such as N-methylethanolamine, N,N-dimethylethanolamine, N,N-diethylethanolamine, N,N-dibutylethanolamine, N-methyldiethanolamine, N-(2-aminoethyl)ethanolamine and 3-amino-1-propanol; and pyridines such as pyridine and 4-aminopyridine. Amino acids such as β-alanine can also be used. This list is not conclusive.

Examples of nitrile compounds are acetonitrile, propionitrile and benzonitrile.

Examples of amides are formamide, dimethylformamide, acetamide, dimethylacetamide, propionamide, benzamide, N,N-dimethylbenzamide.

Examples of sulfur-comprising donors are thiols such as dodecyl mercaptan, thioethers, dialkyl disulfides and sulfoxides such as dimethyl sulfoxide, sulfones, sulfonic esters such as methyl methylsulfonate, dialkyl sulfates such as dimethyl sulfate.

Suitable phosphorus-comprising donors are phosphanes such as triphenylphosphine, phosphane oxides such as triphenylphosphane oxide, trialkyl, triaryl or mixed aryl/alkyl phosphites, trialkyl, triaryl or mixed aryl/alkyl phosphates; compounds of the formula $PR_{3-x}(OR)_x$ or $P(O)R_{3-x}(OR)_x$ (where R is an alkyl or aryl radical and x=1 or 2); phosphoramides such as hexamethylphosphoramide.

Further suitable ligands are polymeric ligands such as polyvinyl alcohol, polyvinylamine, polyethers such as polyalkylene glycols, e.g. polyethylene glycols, polyalkylene glycol monoalkyl or dialkyl ethers, polyalkylenamines such as polyethylenamines, polyalkylenimines, e.g. polyethylenimines having molar masses of preferably from 300 to 20 000, in particular from 300 to 5000, polyamides such as Nylon 6 or Nylon 6.6 and aliphatic or aromatic polyketones.

In general, the ligand is selected from among alcohols, ketones, ethers, amines, nitriles, amides and sulfoxides.

In particularly preferred embodiments, the donor comprises a first donor $L^1$ and a second donor $L^2$, where $L^1$ is an ether and $L^2$ is selected from among alcohols, carboxylic acids, carboxylic esters, amines, nitriles, amides and sulfoxides. Preferred donors $L^1$ are selected from among ethers of the formula R—O—R', where R and R' are each, independently of one another, methyl, ethyl, n-propyl, i-propyl, n-butyl, i-butyl, s-butyl or tert-butyl. Preference is given to at least one of the radicals R and R' being methyl.

In particularly preferred embodiments, the donor comprises a first donor $L^1$ and a second donor $L^2$, where $L^1$ is an ether other than a tertiary alkyl ether and $L^2$ is selected from among alcohols, tertiary alkyl ethers, carboxylic acids, carboxylic esters, amines, nitriles, amides and sulfoxides. Preferred donors $L^1$ are selected from among ethers of the formula R—O—R', where R and R' are each, independently of one another, methyl, ethyl, n-propyl, i-propyl, n-butyl, i-butyl or s-butyl. Preference is given to at least one of the radicals R and R' being methyl; dimethyl ether is particularly preferred. Preferred donors $L^2$ are methyl tert-butyl ether, diisopropyl ether, methanol, dimethylformamide, dimethyl sulfoxide.

In preferred embodiments, the donor $L^1$ is present in at least a stoichiometric amount, e.g. in an amount of from 0.8 to 1.2 molar equivalents, based on the element M. The donor $L^2$ is preferably present in an amount of up to 0.4 molar equivalent, preferably from 0.001 to 0.15 molar equivalent, based on the element M.

A particularly preferred catalyst comprises $HBF.O(CH_3)_2$, if appropriate in combination with a further electron donor, in particular a donor as described above as $L_2$.

The concentration of the catalyst in the reactor in the preparation of isobutene polymers having number average molecular weights in the range from 200 to 5000 is, for example, from 0.01 to 3% by weight, based on the liquid reaction phase; in the case of the preparation of isobutene polymers having number average molecular weights in the range from 5000 to 50 000, it is, for example, from 0.001 to 0.01% by weight.

The catalysts used according to the invention can be produced in any advantageous way. They can be prefabricated or generated in situ in the polymerization mixture. The catalyst complexes can be performed in separate reactors before being used in the process of the invention, temporarily stored after their formation and introduced into the polymerization apparatus as required. This variant is preferred. To prepare the catalyst beforehand, a fluoroelement acid is complexed with the selected donor or the fluoroelement acid is dissolved therein. For example, tetrafluoroboric acid can be reacted with dimethyl ether. The fluoroelement acid can in turn be obtained by reacting a fluorine compound of the formula $MF_{x-1}$ with hydrogen fluoride HF, e.g. by reacting $BF_3$ with HF. As an alternative, a complex comprising the fluorine compound and a donor is reacted with hydrogen fluoride. Thus, for example, a boron trifluoride etherate, e.g. boron trifluoride dimethyl etherate or boron trifluoride diethyl etherate, can be reacted with hydrogen fluoride to give the catalyst. The reactions are preferably carried out in bulk or alternatively in an inert solvent such as one of the abovementioned diluents. The hydrogen fluoride can be used in gaseous form or in the form of a solution in an inert solvent.

Another variant is to generate the catalyst complexes in situ in the polymerization apparatus. In this process variant, either
(i) the donor and separately therefrom the acid $H_aMF_x$, or
(ii) the fluorine compound $MF_{x-1}$ together with the donor and separately therefrom hydrogen fluoride; or
(iii) the fluorine compound $MF_{x-1}$, the donor and hydrogen fluoride in separate streams are fed into the polymerization apparatus and dissolved or dispersed in the reaction mixture. Here, the components react to form the catalytically active complex. The components are advantageously dissolved in a suitable solvent and introduced in the form of the a solution into the reaction mixture. Instead of an additional solvent, isobutene or the reaction mixture of unreacted isobutene and polyisobutene can function as solvent in the in-situ generation of the catalyst complex.

If the catalyst complex comprises more than one donor, the donors can be premixed or added separately from one another in various stages of the formation of the catalyst. It is sometimes advantageous to meter a preformed complex comprising a fluoroelement acid and a first donor in one stream and a second donor in a separate stream into the polymerization mixture.

The catalytically active complex is finely dispersed in the reaction mixture. Fine dispersion is achieved by means of suitable apparatuses such as stirrers, preferably high-speed stirrers, static mixers, orifice plates for decreasing the cross section, mixing pumps and the like.

The polymerization according to the invention can also be carried out in the presence of a fluoride scavenger. Suitable fluoride scavengers are organosilicon compounds which have at least one Si—O, Si—C, Si—H bond or a bond from a silicon atom to a halogen atom other than fluorine. Suitable organosilicon compounds are, for example, phenyltrimethylsilane, phenyltrichlorosilane or trimethysilane.

Preferred organosilicon compounds of this type are those of the general formula II:

(II)

where n is 1, 2 or 3,
the radicals $R^a$ can be identical or different and are each, independently of one another, $C_1$-$C_{20}$-alkyl, $C_5$-$C_7$-cycloalkyl, aryl or aryl-$C_1$-$C_4$-alkyl, with the latter three radicals also being able to bear one or more $C_1$-$C_{10}$-alkyl groups as substituents, and
the radicals $R^b$ are identical or different and are each $C_1$-$C_{20}$-alkyl or, when n is 1 or 2, two radicals $R^b$ can together be alkylene.

In the formula II, n is preferably 1 or 2. $R^a$ is preferably a $C_1$-$C_8$-alkyl group and in particular a branched alkyl group or an alkyl group bound via a secondary carbon atom, e.g. isopropyl, isobutyl, 2-butyl, or a 5-, 6- or 7-membered cycloalkyl group or an aryl group. The variable $R^b$ is preferably a $C_1$-$C_4$-alkyl group or a phenyl, tolyl or benzyl radical.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluoylsilane, triethoxybenzylsilane and triethoxyphenylsilane.

The polymerization can be carried out batchwise or preferably continuously. In a continuous process, part of the reaction mixture comprised in the polymerization reactor is continuously discharged. An amount of starting materials corresponding to the output is continuously fed into the polymerization reactor. The recycle/fresh freed ratio, i.e. the ratio of the amount of substance present in the polymerization reactor to the amount which is discharged, is generally in the range from 1000:1 to 1:1, preferably in the range from 500:1 to 5:1 and in particular in the range from 20:1 to 100:1 vol/vol. The mean residence time of the monomers to be polymerized in the polymerization reactor can be from 5 seconds to a number of hours. Residence times of from 1 to 30 minutes, in particular from 2 to 20 minutes, are preferred. The polymerization is carried out in the reactors customary for continuous polymerization, e.g. stirred vessels, tube reactors, shell-and-tube reactors and loop reactors, with loop reactors, i.e. tube or shell-and-tube reactors with circulation and turbulent flow or internals such as static mixers, i.e. having stirred tank characteristics, being preferred. Loop reactors having tube cross sections which lead to turbulent flow are particularly advantageous. It is possible to use reactors connected in series, in particular arrangements comprising a main reactor and an after-reactor.

The polymerization is generally carried out at a temperature in the range from −60° C. to +40° C., preferably less than 0° C., particularly preferably in the range from −5° C. to −40° C. and especially in the range from −10° C. to −30° C. The heat of polymerization is appropriately removed by means of a cooling apparatus. This can be operated using, for example, liquid ammonia as coolant.

Another possible way of removing the heat of polymerization is evaporative cooling. Here, the heat liberated is removed by vaporization of volatile constituents of the reaction mixture, e.g. a volatile solvent. From a process engineering point of view, it is particularly advantageous to use diluents which boil in the desired temperature range.

The polymerization process of the invention is preferably carried out under isothermal conditions, i.e. the temperature of the liquid reaction mixture in the polymerization reactor has a steady-state value and does not change, or changes only to a minor extent, during operation of the reactor.

In the continuous polymerization of isobutene, the steady-state concentration of isobutene in the liquid reaction phase is from 0.2 to 50% by weight, preferably from 0.5 to 20% by weight and in particular from 1 to 10% by weight, based on the liquid reaction phase.

A further decrease in the isobutene concentration can be achieved in a downstream reactor. In general, a backmixed main reactor is followed by an after-reactor which has approximate plug flow characteristics. A preferred mode of operation for a multistage method is described in WO 96/40808. According to this method, the polymerization is, in its simplest form, carried out in two polymerization stages. The output from the first polymerization stage is preferably fed directly into the second polymerization stage. Here, the polymerization is continued without addition of fresh isobutene. For example, it is possible to set an isobutene conversion of from 5 to 98%, preferably from 50 to 95%, in particular from 50 to 90%, in the first polymerization stage and then to continue the polymerization in the second stage. The second polymerization stage is advantageously operated at the same polymerization temperature or a lower polymerization temperature than the first polymerization stage; the temperature difference here is generally from 0 to 20° C., preferably from 0 to 10° C.

In general, the isobutene conversion in the second polymerization stage is set so that the total conversion of isobutene in the first and second polymerization stages is generally from 80 to 100%, preferably from 90 to 100%, in particular from 95 to 100%.

If the polymerization mixture in the second stage still comprises more than 2% by weight of isobutene, based on the isobutene fed into the first stage, the unreacted isobutene together with the polymerization mixture leaving the second polymerization stage can, as an alternative, be fed without further work-up to a third polymerization stage and there polymerized further to an isobutene content of less than 2% by weight.

Although the use of second and third polymerization stages is advantageous even when pure isobutene is used, it has been found to be particularly advantageous when isobutene-comprising $C_4$-hydrocarbon streams such as $C_4$ raffinates or $C_4$ fractions are used as starting material, since this makes it possible to obtain, in addition to the polyisobutene, a high-quality, virtually fluorine-free raffinate II which is low in isobutene.

The reaction mixture discharged from the polymerization reactor still comprises polymerizable monomers and catalyst. For this reason, the polymerization generally continues to proceed in the output. As a result, the polymer formed in the polymerization reactor can be altered in an undesirable way in respect of molecular weight, molecular weight distribution and end group content. To prevent further reaction, the polymerization is therefore usually stopped by deactivation of the catalyst. The deactivation can, for example, be effected by addition of water, alcohols, acetonitrile, ammonia or aqueous solutions of mineral bases or by introducing the output into one of the abovementioned media. Preference is given to deactivation using water, which is preferably carried out at temperatures in the range from 1 to 80° C. (water temperature).

The complex catalysts can also be substantially separated off from the output and recirculated to the polymerization reaction. When the reaction mixture is allowed to stand, e.g. in a phase separation vessel through which the reaction mixture flows at a reduced velocity, the finely divided droplets of the catalyst coalesce quickly and form a coherent phase. The droplets of complex or the coherent phase have a significantly higher density than the polymer solution. They can therefore generally be separated off from the polymer-rich, catalyst-depleted product phase by means of precipitators, separators or other collection vessels.

The formation of a coherent catalyst phase can be improved by means of a coalescer, i.e. a filtration device which converts small hydrophilic droplets of complex into larger drops by means of a filter material which has suitable pore diameters and/or is hydrophilic. As hydrophilic filter material, use is frequently made of glass fibers, phenolic resins or phenolic resin coatings, but acrylonitrile fibers or coatings are also suitable at this point. This coalescence is frequently aided by means of a separator, in this case a hydrophobic filtration. A hydrophobic filter material, if appropriate in combination with a narrow pore diameter, prevents finely divided catalyst droplets from passing through it. The polymer-rich product phase separated off from the catalyst phase is generally homogeneous and comprises only small amounts of soluble catalyst. These are deactivated in the above-described way, preferably by means of water.

The sum of the proportions of molecules having the double bond in the α position and in the β position (based on the number of all olefinically unsaturated macromolecules in a sample) in the polyisobutene obtained by the process of the invention is at least 75 mol %, preferably at least 80 mol %, most preferably at least 95 mol %. The proportion of molecules having the double bond in the α position (based on the number of all olefinically unsaturated macromolecules in a sample) is preferably at least 60 mol %, particularly preferably at least 75 mol %. The proportions of the molecules having the double bond in the α position and in the β position can be determined by means of $^1$H-NMR and/or $^{13}$C-NMR spectroscopy, as a person skilled in the art will know.

The polyisobutene obtained by the process of the invention has a number average molecular weight $M_n$ of from 200 to 50 000, preferably from 400 to 5000, in particular from 550 to 2800. The polydispersity ($D=M_2/M_n$) is typically less than 10, preferably less than 2.2 and in particular less than 2.0. Polyisobutenes having a number average molecular weight of less than 1500 typically have a polydispersity of less than 1.7.

The fluorine content of the isobutene polymer obtained is, after removal of the diluent, typically less than 30 ppm, usually less than 15 ppm. In particularly preferred embodiments, the fluorine content is in the range from the detection limit to 10 ppm. If desired, the fluorine content can be reduced further by treating the isobutene polymer with an inorganic adsorbent such as aluminum oxide.

The invention is illustrated by the following examples.
In the examples, the following abbreviations are used:

| | |
|---|---|
| IB: | isobutene |
| R: | raffinate I |
| Me$_2$O: | dimethyl ether |
| Et$_2$O: | diethyl ether |
| i-Pr$_2$O: | diisopropyl ether |
| MTBE: | methyl tert-butyl ether |
| MeOH: | methanol |
| DMF: | dimethylformamide |
| DMSO: | dimethyl sulfoxide |
| PhSi(OEt)$_3$: | phenyltriethoxysilane |

EXAMPLES 1 TO 11

Batch Polymerization

The reactions were carried out in a 500 ml four-neck flask provided with a 250 ml dropping funnel with pressure equilibration and superposed dry ice condenser, thermometer, septum and inlet for blanketing with nitrogen gas. Raffinate I having the composition indicated below was introduced via a flexible steel hose into a cooled reservoir comprising a 3 Å molecular sieve and liquefied by cooling in dry ice. The liquefied raffinate I was then transferred via a flexible steel hose to the dropping funnel. The measurement of the volume was carried out by means of the scale on the dropping funnel. The catalyst complex was introduced by means of a disposable syringe into the raffinate I which had been placed in the four-neck flask. After the reaction time, the reaction was stopped by means of isopropanol and the reaction mixture was diluted with 150 ml of hexane. The solution washed three times with water; the solvent was removed under reduced pressure. In Example 1, a solution of isobutene in hexane (50:50 vol/vol) was used in place of raffinate I. The results are summarized in Table 1.

EXAMPLES 12 TO 18 AND COMPARATIVE EXAMPLES 19 AND 20

Continuous Polymerization

A reactor comprising a steel tube having a length of 3 m and an internal diameter of 6 mm through which 100 l/h of reactor contents were circulated by means of a gear pump was used. Tube and pump had a volume of about 100 ml. The Teflon hose and the pump head were located in a refrigeration bath at −25° C. (cryostat). Raffinate I (Examples 13 to 20) or isobutene/hexane:solution (50:50 vol/vol; Example 12) which had been precooled to −25° C. and dried to less than 3 ppm of water over a 3 Å molecular sieve was fed in via a capillary having an internal diameter of 2 mm. The catalyst complex was fed directly into the circulating liquid on the suction side of the circulation pump.

The reaction product mixture was quenched with water in a mixing pump immediately after leaving the circulator. After the aqueous phase had been separated off, the organic phase was passed to drying over a 3 Å zeolite.

In Comparative Examples 19 and 20, a catalyst complex comprising boron trifluoride was used.

The results are reported in Table 2.

Composition of the Raffinate I

| Isobutane | 6% by weight |
|---|---|
| n-Butane | 15% by weight |
| Isobutene | 45% by weight |
| 1-Butene | 23% by weight |
| cis-2-Butene | 5% by weight |
| trans-2-Butene | 8% by weight |
| Butadiene | 0.020% by weight |

TABLE 1

| Example | Feed | Catalyst/mmol | IB/HBF$_4$ [mol/mol] | Time [min] | Fluorine [ppm] | M$_n$ [g/mol] | M$_w$/M$_n$ | α [%] |
|---|---|---|---|---|---|---|---|---|
| 1 | IB | HBF$_4$/Me$_2$O 7.5/7.5 | 178 | 180 | 3 | 782 | 1.4 | 73 |
| 2 | R | HBF$_4$/Et$_2$O/MTBE 7.5/7.5/1.36 | 146 | 180 | 3 | 558 | 1.1 | 76 |
| 3 | R | HBF$_4$/Et$_2$O/i-Pr$_2$O 7.5/7.5/7.5 | 146 | 180 | 13 | 1092 | 1.5 | 81 |
| 4 | R | HBF$_4$/Me$_2$O 7.5/7.5 | 178 | 180 | 7 | 720 | 1.2 | 78 |
| 5 | R | HBF$_4$/Me$_2$O/i-Pr$_2$O 11.2/11.2/0.19 | 119 | 90 | 11 | 852 | 1.5 | 52 |
| 6 | R | HBF$_4$/Me$_2$O/MTBE 8.1/8.2/0.23 | 162 | 120 | 5 | 1022 | 1.5 | 69 |
| 7 | R | HBF$_4$/Me$_2$O/methanol 5.6/5.6/0.59 | 237 | 90 | 2 | 971 | 1.5 | 73 |
| 8 | R | HBF$_4$/Me$_2$O/water 7.5/7.5/0.14 | 178 | 180 | 3 | 522 | 1.1 | 83 |
| 9 | R | HBF$_4$/Me$_2$O/DMF 5.6/5.6/0.26 | 237 | 90 | 4 | 679 | 1.3 | 68 |
| 10 | R | HBF$_4$/Me$_2$O/DMSO 8.1/8.1/0.28 | 165 | 90 | 10 | 732 | 1.3 | 67 |
| 11 | R | HBF$_4$/Me$_2$O/PhSi(OEt)$_3$ 11.2/11.2/0.83 | 119 | 90 | 6 | 660 | 1.2 | 71 |

TABLE 2

| Example | Feed | Catalyst/mmol | IB/HBF$_4$ [mol/mol] | Fluorine [ppm] | M$_n$ [g/mol] | M$_w$/M$_n$ | α [%] |
|---|---|---|---|---|---|---|---|
| 12 | IB | HBF$_4$/Me$_2$O 23.3/23.3 | 229 | 4 | 732 | 1.7 | 78 |
| 13 | R | HBF$_4$/Et$_2$O 16.5/16.5 | 153 | 2 | 573 | 1.1 | 79 |
| 14 | R | HBF$_4$/Et$_2$O/MTBE 29.3/29.3/3.1 | 171 | 1 | 582 | 1.1 | 72 |
| 15 | R | HBF$_4$/Me$_2$O/MTBE 22.6/22.6/1.2 | 222 | 3 | 760 | 1.2 | 78 |
| 16 | R | HBF$_4$/Me$_2$O/MTBE 21.2/21.4/0.4 | 238 | 7 | 1297 | 1.7 | 75 |
| 17 | R | HBF$_4$/Me$_2$O/MTBE 26.4/26.4/2.0 | 190 | 44 | 2032 | 2.1 | 80 |
| 18 | R | HBF$_4$/Me$_2$O/MeOH 14.1/14.1/2.0 | 326 | 6 | 938 | 1.6 | 73 |

TABLE 2-continued

| Example | Feed | Catalyst/mmol | IB/HBF$_4$ [mol/mol] | Fluorine [ppm] | M$_n$ [g/mol] | M$_w$/M$_n$ | α [%] |
|---|---|---|---|---|---|---|---|
| 19 | R | BF$_3$/MeOH 13.0/22.7 | | 120 | 1230 | 2.4 | 79 |
| 20* | R | Bf$_3$/MeOH 17.0/22.7 | | 79 | 868 | 2.7 | 63 |

*Comparative Example

The invention claimed is:

1. A process for preparing a singly ethylenically unsaturated isobutene polymer comprising at least 80% by weight of isobutene in which the sum of the proportions of molecules having the double bond in the α position and molecules having the double bond in the β position is at least 75 mol %, comprising:

polymerizing isobutene in the liquid phase in the presence of a dissolved or dispersed catalyst complex which comprises (i) one or more electron donors and (ii) a compound of formula I $$H_aMe_b[MF_x]_c \qquad (I)$$

where
Me is a metal in the oxidation state m,
M is at least one element, in the oxidation state n, of groups 2, 3, 4, 5, 10, 11, 13, 14 and 15 of the Periodic Table of the Elements according to the IUPAC notation,
a is an integer $\geq 1$,
b is an integer $\geq 0$,
x is an integer $\geq 2$,
c is [(a+mb)/(x−n)],
wherein the catalyst is free of BF$_3$ when HBF$_4$ is the compound of formula (I), and
wherein the electron donor is at least one selected from the group consisting of polyvinyl alcohols, polyvinylamine, polyethers, polyalkylenamines, polyalkylenimines, polyamides and polyketones.

2. The process according to claim 1, wherein M is at least one element selected from the group consisting of Be, B, Al, Si, P, Ti, V, Ga, Ge, As, Y, Zr, Nb, In, Sn and Sb.

3. The process according to claim 1, wherein H$_a$Me$_b$[MF$_x$]$_c$ is at least one selected from the group consisting of H$_2$BeFe$_4$, HBF$_4$, HPF$_6$, H$_2$SiF$_6$, HMeSiF$_6$, HAlF$_4$, and H$_3$AlF$_6$, where Me is Li, Na or K.

4. The process according to claim 1, wherein a C$_4$-hydrocarbon stream comprising butenes other than isobutene is used as isobutene source.

5. The process according to claim 1, wherein a mixture of isobutene with a nonolefinic diluent is used as isobutene source.

6. The process according to claim 1, wherein the polymerizing forms an isobutene polymer having a number average molecular weight of 5,000-50,000.

7. The process according to claim 1, wherein the catalyst comprises HBF$_4$·OR$^c_2$ wherein R$^c$ is at least one of methyl, ethyl, n-propyl, i-propyl, n-butyl, i-butyl, s-butyl and t-butyl.

8. A process for preparing a singly ethylenically unsaturated isobutene polymer comprising at least 80% by weight of isobutene in which the sum of the proportions of molecules having the double bond in the α position and molecules having the double bond in the β position is at least 75 mol %, comprising:

polymerizing isobutene in the liquid phase in the presence of a dissolved or dispersed catalyst complex which comprises (i) one or more electron donors and (ii) a compound of formula I $$H_aMe_b[MF_x]_c \qquad (I)$$

where
Me is a metal in the oxidation state m,
M is at least one element, in the oxidation state n, of groups 2, 3, 4, 5, 10, 11, 13, 14 and 15 of the Periodic Table of the Elements according to the IUPAC notation,
a is an integer $\geq 1$,
b is an integer $\geq 0$,
x is an integer $\geq 2$,
c is [(a+mb)/(x−n)],
wherein the catalyst is free of BF$_3$ when HBF$_4$ is the compound of formula (I), and
wherein the electron donor comprises a first donor L$^1$ and a second donor L$^2$ and L$^1$ is an ether and L$^2$ is at least one selected from the group consisting of alcohols, carboxylic acids, carboxylic esters, amines, nitriles, amides and sulfoxides.

9. The process according to claim 8, wherein M is at least one element selected from the group consisting of Be, B, Al, Si, P, Ti, V, Ga, Ge, As, Y, Zr, Nb, In, Sn and Sb.

10. The process according to claim 8, wherein H$_a$Me$_b$[MF$_x$]$_c$ is at least one selected from the group consisting of H$_2$BeF$_4$, HBF$_4$, HPF$_6$, H$_2$SiF$_6$, HMeSiF$_6$, HAlF$_4$, and H$_3$AlF$_6$, where Me is Li, Na or K.

11. The process according to claim 8, wherein a C$_4$-hydrocarbon stream comprising butenes other than isobutene is used as isobutene source.

12. The process according to claim 8, wherein a mixture of isobutene with a nonolefinic diluent is used as isobutene source.

13. The process according to claim 8, wherein the polymerizing forms an isobutene polymer having a number average molecular weight of 5,000-50,000.

14. A process for preparing a singly ethylenically unsaturated isobutene polymer comprising at least 80% by weight of isobutene in which the sum of the proportions of molecules having the double bond in the α position and molecules having the double bond in the β position is at least 75 mol %, comprising:

polymerizing isobutene in the liquid phase in the presence of a dissolved or dispersed catalyst complex which comprises (i) one or more electron donors and (ii) a compound of formula I $$H_aMe_b[MF_x]_c \qquad (I)$$

where
Me is a metal in the oxidation state m,
M is at least one element, in the oxidation state n, of groups 2, 3, 4, 5, 10, 11, 13, 14 and 15 of the Periodic Table of the Elements according to the IUPAC notation,
a is an integer $\geq 1$,
b is an integer $\geq 0$,
x is an integer $\geq 2$,
c is [(a+mb)/(x−n)],
wherein the catalyst is free of BF$_3$ when HBF$_4$ is the compound of formula (I), and wherein the electron donor comprises a first donor $L^1$ and a second donor $L^2$ and $L^1$ is an ether other than a tertiary alkyl ether and $L^2$ is at least one selected from the group consisting of alcohols, tertiary alkyl ethers, carboxylic acids, carboxylic esters, amines, nitriles, amides and sulfoxides.

15. The process according to claim 14, wherein $L^1$ is one or more ethers of the formula R—O—R', where R and R' are each, independently of one another, methyl, ethyl, n-propyl, i-propyl, n-butyl, i-butyl or s-butyl.

16. The process according to claim 15, wherein the catalyst comprises $HBF_4 \cdot O(CH_3)_2$.

17. The process according to claim 14, wherein M is at least one element selected from the group consisting of Be, B, Al, Si, P, Ti, V, Ga, Ge, As, Y, Zr, Nb, In, Sn and Sb.

18. The process according to claim 14, wherein $H_aMe_b[MF_x]_c$ is at least one selected from the group consisting of $H_2BeF_4$, $HBF_4$, $HPF_6$, $H_2SiF_6$, $HMeSiF_6$, $HAlF_4$, and $H_3AlF_6$, where Me is Li, Na or K.

19. The process according to claim 14, wherein a $C_4$-hydrocarbon stream comprising butenes other than isobutene is used as isobutene source.

20. The process according to claim 14, wherein a mixture of isobutene with a nonolefinic diluent is used as isobutene source.

21. The process according to claim 14, wherein the polymerizing forms an isobutene polymer having a number average molecular weight of 5,000-50,000.

22. A process for preparing an isobutene polymer comprising at least 80% by weight of isobutene and consisting essentially of singly ethylenically unsaturated isobutene wherein the sum of the proportions of isobutene molecules having the double bond in the α position and the isobutene molecules having the double bond in the β position is at least 75 mol %, comprising:
polymerizing isobutene in the liquid phase in the presence of a dissolved or dispersed catalyst complex which comprises (i) one or more electron donors and (ii) a compound of formula (I)

$$H_aMe_b[MF_x]_c \quad (I)$$

where
Me is a metal in the oxidation state m,
M is at least one element, in the oxidation state n, of groups 2, 3, 4, 5, 10, 11, 13, 14 and 15 of the Periodic Table of the Elements according to the IUPAC notation,
a is an integer ≧1,
b is an integer ≧0,
x is an integer ≧2,
c is [(a+mb)/(x−n)],
wherein, the catalyst consists essentially of $HBF_4 \cdot O(CH_3)_2$.

23. The process according to claim 22, wherein M is at least one element selected from the group consisting of Be, B, Al, Si, P, Ti, V, Ga, Ge, As, Y, Zr, Nb, In, Sn and Sb.

24. The process according to claim 22, wherein $H_aMe_b[MF_x]_c$ is at least one compound selected from the group consisting of $H_2BeF_4$, $HBF_4$, $HPF_6$, $H_2SiF_6$, $HMeSiF_6$, $HAlF_4$, and $H_3AlF_6$, where Me is Li, Na or K.

25. The process according to claim 22, wherein the catalyst comprises $HBF_4 \cdot OR^c_2$ wherein $R^c$ is at least one of methyl, ethyl, n-propyl, i-propyl, n-butyl, i-butyl, s-butyl and t-butyl.

26. The process according to claim 22, wherein M is at least one element selected from the group consisting of Be, B, Al, Si, P, Ti, V, Ga, Ge, As, Y, Zr, Nb, In, Sn and Sb.

27. The process according to claim 22, wherein $H_aMe_b[MF_x]_c$ is at least one selected from the group consisting of $H_2BeF_4$, $HBF_4$, $HPF_6$, $H_2SiF_6$, $HMeSiF_6$, $HAlF_4$, and $H_3AlF_6$, where Me is Li, Na or K.

28. The process according to claim 22, wherein a $C_4$-hydrocarbon stream comprising butenes other than isobutene is used as isobutene source.

29. The process according to claim 22, wherein a mixture of isobutene with a nonolefinic diluent is used as isobutene source.

30. The process according to claim 22, wherein the polymerizing forms an isobutene polymer having a number average molecular weight of 5,000-50,000.

31. A process for preparing a singly ethylenically unsaturated isobutene polymer comprising at least 80% by weight of isobutene in which the sum of the proportions of molecules having the double bond in the α position and molecules having the double bond in the β position is at least 75 mol %, comprising:
polymerizing isobutene in the liquid phase in the presence of a dissolved or dispersed catalyst complex which comprises (i) one or more electron donors and (ii) a compound of formula I $$H_aMe_b[MF_x]_c \quad (I)$$

where
Me is a metal in the oxidation state m,
M is at least one element, in the oxidation state n, of groups 2, 3, 4, 5, 10, 11, 13, 14 and 15 of the Periodic Table of the Elements according to the IUPAC notation,
a is an integer ≧1,
b is an integer ≧0,
x is an integer ≧2,
c is [(a+mb)/(x−n)],
wherein the catalyst is free of $BF_3$ when $HBF_4$ is the compound of formula (I), and
wherein the polymerizing is carried out to form a polyisobutene having a $M_w/M_n$ of 1.1-1.7.

32. The process according to claim 31, wherein the electron donor comprises at least one of a nitrogen atom, an oxygen atom and a sulfur atom.

33. The process according to claim 31, wherein the electron donor is at least one selected from the group consisting of alcohols, ketones, ethers, carboxylic acids, carboxylic esters, amines, nitriles, amides and sulfoxides.

34. The process according to claim 31, wherein the electron donor comprises at least one of a nitrogen atom, an oxygen atom and a sulfur atom.

35. The process according to claim 31, wherein the electron donor is at least one selected from the group consisting of an alcohol, a ketone, an ether, a carboxylic acid, a carboxylic ester, an amine, a nitrile, an amide and a sulfoxide.

36. The process according to claim 31, wherein the electron donor is at least one selected from the group consisting of a polyvinyl alcohol, a polyvinylamine, a polyether, a polyalkylenamine, a polyalkylenimine, a polyamide and a polyketone.

37. The process according to claim 31, wherein the electron donor comprises a first donor $L^1$ and a second donor $L^2$ and $L^1$ is an ether and $L^2$ is at least one selected from the group consisting of an alcohol, a carboxylic acid, a carboxylic ester, an amine, a nitrile, an amide and a sulfoxide.

38. The process according to claim 31, wherein the electron donor comprises a first donor $L^1$ and a second donor $L^2$ and $L^1$ is an ether other than a tertiary alkyl ether and $L^2$ is at least one selected from the group consisting of an alcohol, a tertiary alkyl ether, a carboxylic acid, a carboxylic ester, an amine, a nitrile, an amide and a sulfoxide.

39. The process according to claim 38, wherein $L^1$ is at least one ether of the formula R—O—R', where R and R' are each, independently of one another, methyl, ethyl, n-propyl, i-propyl, n-butyl, i-butyl or s-butyl.

40. The process according to claim 31, wherein M is at least one element selected from the group consisting of Be, B, Al, Si, P, Ti, V, Ga, Ge, As, Y, Zr, Nb, In, Sn and Sb.

41. The process according to claim 31, wherein $H_aMe_b[MF_x]_c$ is at least one selected from the group consisting of $H_2BeF_4$, $HBF_4$, $HPF_6$, $H_2SiF_6$, $HMeSiF_6$, $HAlF_4$, and $H_3AlF_6$, where Me is Li, Na or K.

42. The process according to claim 31, wherein a $C_4$-hydrocarbon stream comprising butenes other than isobutene is used as isobutene source.

43. The process according to claim 31, wherein a mixture of isobutene with a nonolefinic diluent is used as isobutene source.

44. The process according to claim 31, wherein the polymerizing forms an isobutene polymer having a number average molecular weight of 5,000-50,000.

* * * * *